July 25, 1967     G. F. SHEATS ETAL     3,332,947
PRODUCTION OF MELAMINE
Filed Sept. 14, 1965
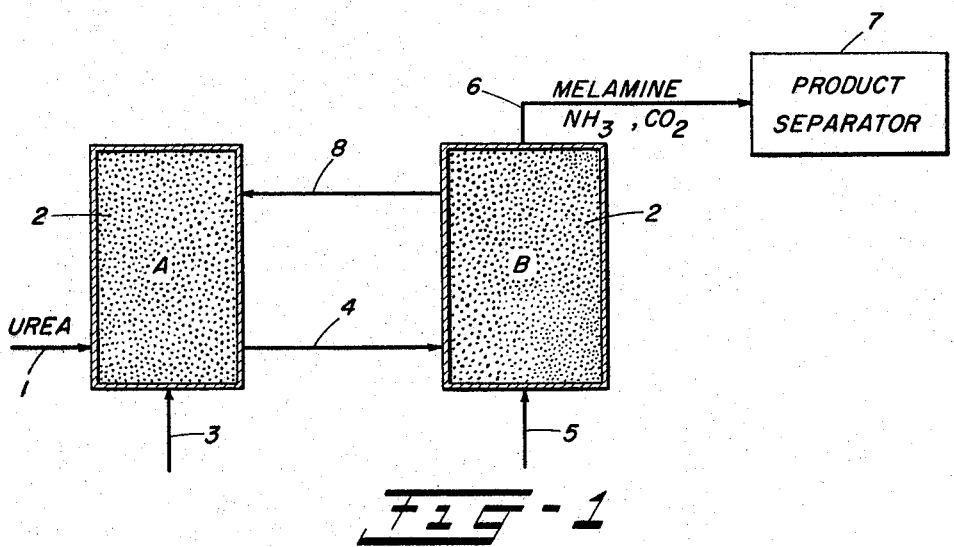
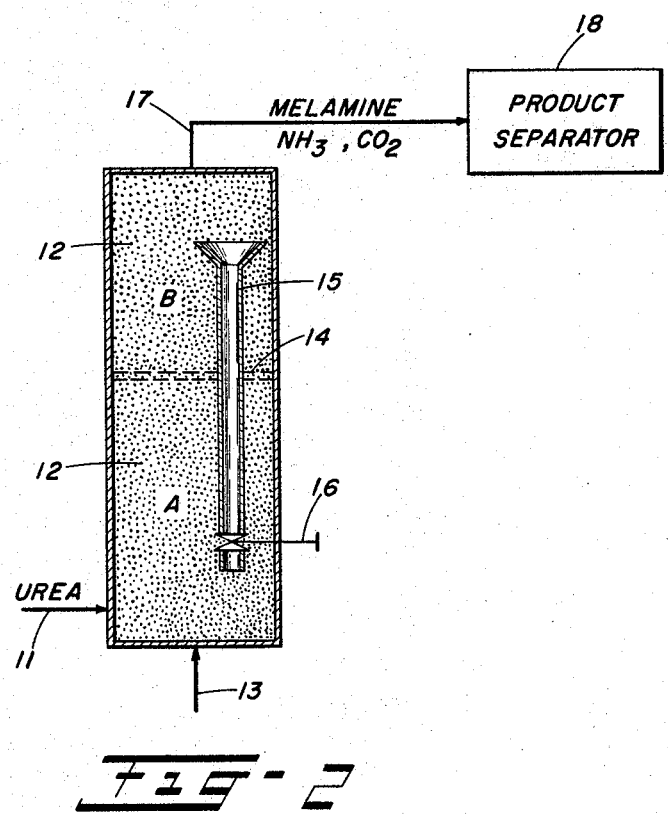
INVENTORS.
GEORGE F. SHEATS
JAMES E. LONGFIELD
BY *Patrick C Baker*
ATTORNEY

United States Patent Office 3,332,947
Patented July 25, 1967

3,332,947
PRODUCTION OF MELAMINE
George Frederic Sheats, Plattsburgh, N.Y., and James Edgar Longfield, Stamford, Conn., assignors to American Cyanamid Company, Stamford, Conn., a corporation of Maine
Filed Sept. 14, 1965, Ser. No. 487,137
6 Claims. (Cl. 260—249.7)

This invention concerns the production of melamine from urea.

U.S. Patent 3,095,416 to Crowley et al. discloses a process for preparing melamine from urea wherein, in a first zone, urea is gasified over an ammonia-fluidized bed of a particulate material which does not catalyze conversion of the urea to melamine under the conditions of the first zone, i.e., atmospheric pressure and temperature range of 230 to 300° C. The gasified urea is then passed over a fluidized bed of a material effective to catalyze formation of melamine, at atmospheric pressure and 350 to 450° C. The reaction is endothermic in the first zone and exothermic in the second zone. Some of the exothermic heat may be transported to the first zone to supply a portion of the heat therein required.

The non-catalytic fluidized bed material is said to be critical since known catalysts for production of melamine from urea under the reaction conditions of the first zone tend to foul the bed and otherwise impair the fluidization. The process is said to have the advantage of improved heat economy and efficiency, and permits the use of lower temperature heat transfer media in the first zone.

A process has now been discovered in which urea is converted to melamine in a two zone reaction with certain modifications which provide substantial advantages over the prior art processes. According to the present invention, urea is efficiently converted to melamine by (1) reactively contacting liquid or solid urea in a first zone at substantially atmospheric pressure and in a temperature range of 130 to 275° C. with a catalyst effective for decomposition of urea to melamine and melamine intermediates, and (2) transporting the resulting catalytic reaction mass to a second zone and reacting therein at a temperature effective for formation of melamine.

By "catalytic reaction mass" is meant catalytic material coated or intimately contacted with, i.e., "loaded" with, urea and the melamine intermediates formed as urea decomposition products in the first zone. Small amounts also of melamine may be present among these decomposition products. Such decomposition products include melamine, melem, melon, ammeline, ammelide, biuret, triuret, and the like.

Unlike the Crowley et al. process, the catalyst is not critical and may be any of the known particulate porous materials commonly employed in catalyzing the decomposition of urea to melamine. Typical materials are silica gel, silica-alumina gel, alumina gel, and activated alumina.

The catalytic material is not critical because, unlike the Crowley et al. process, a substantial portion of the catalyst absorbed or loaded with urea and melamine intermediates is transported into the second, higher temperature zone. As a consequence no problems are encountered in the first zone with fouling of the bed, e.g., clogging due to agglomerization of catalyst particles with urea, melamine, and melamine intermediates.

The loading and transporting of the catalyst as described provides more rapid and more complete conversion of the urea to melamine since, as is known, melamine is most efficiently formed when urea is absorbed or loaded onto a porous particulate material which is then reacted at substantially atmospheric pressure above about 325° C. According to the present process, it has been discovered that efficient loading, i.e., catalytic contact, is effected by reacting urea with the catalyst in a first zone in the stated lower temperature range and thereafter transporting a substantial portion of the resulting catalytic reaction mass into a second zone for reaction at a higher temperature.

It has been found that not only may loading be effected at lower temperatures but also less heat is required in the first zone, e.g., about 20 kcal./mole urea as compared to about 50 kcal./mole urea for the Crowley et al. process wherein urea is said to be gasified, probably with decomposition to isocyanic acid. Although the Crowley et al. process supplies some of the first zone heat intake by returning some of the heat evolved in the exothermic second zone reaction (as compared to only a slight endotherm in the second zone of the present process), the greater first zone endotherm and heat return requires expensive and elaborate heat exchange apparatus having greater heat exchange surface. The present process avoids or minimizes this expense.

The catalytic reaction mass may be transported into the second zone by pneumatic conveying using, for example, ammonia and carbon dioxide first zone byproduct gases as the carrying gas, or by known conducting means such as bucket conveyers and the like. The byproduct gases also promote beneficial fluidization of the bed. Preferably, however, a dry, inert sweeping gas will be employed in addition to byproduct gases to fluidize and transport the catalytic reaction mass into the second zone. Typical gases are ammonia, carbon dioxide and nitrogen-ammonia mixtures. These and byproduct gases may be vented to the atmosphere or recycled to the first zone as desired.

While applicable to a batch process, the present invention is preferably practiced in a continuous operation whereby the catalyst is continuously loaded with urea and decomposition products, transported and reacted in a second zone, stripped of melamine, and returned to the first zone for reloading. The two zones may be designed as compartments of a single unit or may be separate units connected by suitable conduits for recycling of catalyst and sweeping gas (if employed). The melamine is stripped from the catalyst together with unconverted materials by the same sweeping gas or an additional stripping gas, e.g., ammonia, carbon dioxide, nitrogen-ammonia mixtures, and the catalyst returned to the first zone or reloading. In effect, a continuously circulating fluidized bed is maintained between the two zones whereby catalyst life is prolonged and corrosion and clogging is eliminated or minimized.

While described particularly with reference to urea the process is operable with various known urea equivalents, i.e., urea decomposition products which are melamine intermediates of other materials. Such materials are biuret, triuret, cyanuric acid, hydrogen isocyanate, ammonium isocyanate, ammelide, ammeline, including mixtures of one or more with or without urea.

In summary, the present process differs from and has the following advantages over prior art processes: (1 urea is substantially decomposed, rather than gasified, to substantially non-gaseous melamine intermediates whic are uniformily loaded with undecomposed urea onto cata lyst in a first zone requiring substantially less heat an therefore less elaborate and expensive heat exchangers (2) the loaded catalytic reaction mass is transported t a second zone for maximum and efficient conversion c absorbed material to melamine, thereby avoiding cloggin of the first zone with catalyst and reactants; (3) in a cor tinuous embodiment of the present process, catalyst lif is prolonged by stripping the catalyst in the second zon and recycling to the first zone for reloading; (4) les cooling of byproduct gases is required in their recovery due to the lower temperature and heat requirements of the first zone; (5) type of catalyst for conversion of urea to melamine is not critical.

Continuous embodiments of the invention are illustrated schematically in the accompanying drawings in which:

FIGURE 1 shows separated first zone reactor A and second zone reactor B; and

FIGURE 2 shows a unit reactor comprising a first zone A and a second zone B.

More particularly, with respect to FIGURE 1, liquid or solid urea is injected by line 1 into a reactor A suitable for decomposition of urea to melamine intermediates and melamine. Reactor A contains catalyst 2 suitable for conversion of urea to melamine intermediates and melamine. The catalyst bed is maintained in the range of 130–275° C. by conventional heat transfer means, e.g., electrical jacket or internal electrical coils, heat transfer tubes or the like. Under reaction conditions, byproduct gases ammonia and carbon dioxide are formed which then promote fluidization of the catalyst. If desired, sweeping gas such as ammonia may be injected by line 3. The catalytic reaction mass formed in reactor A is then transported by byproduct gas, sweeping gas or suitable conveyor system over line 4 to reactor B. Reactor B is maintained in an operating temperature range of from about 325–450° C. whereby the reaction product material on the catalyst particles is converted to melamine. A stripping gas such as ammonia is injected by line 5 to remove the melamine from the catalytic particles. The melamine together with other decomposition products including ammonia and carbon dioxide is carried by line 6 to product separator 7 wherein, by suitable means such as quenching, the melamine is separated and purified. The remaining stripped catalyst is then recycled by line 8 to reactor A for reloading and continued reaction.

With respect to FIGURE 2, a single reactor unit is provided having a lower temperature reaction zone A and a higher reaction temperature zone B. Initially, a catalytic bed of catalyst 12, effective for conversion of urea to melamine and melamine intermediates, is provided in zone A. Said zone is maintained at a temperature of 130 to 275° C. by suitable external or internal heating means. Liquid or solid urea is injected by line 1 into reaction zone A. A sweeping gas such as ammonia is admitted by line 13 to facilitate fluidization and to transport the catalytic reaction mass from zone A to zone B. Said zones are separated by a baffle 14 to assist in establishing the lower temperature range in zone A and higher temperature range of about 325–450° C. in zone B. Said baffle may possess various configurations to permit passage of the catalyst particles from zone A to zone B while maintaining the temperature differential. Thus baffle 14 may be plate-like having a plurality of openings for the passage of sweeping gas and catalysts. The baffle may also have a truncated conical upward-extending configuration having merely a centrally located circular opening or a plurality of openings for passage of the gas stream and catalysts. Positioned vertically within the unit reactor and extending from zone A into zone B is standpipe 15 having a slide valve 16 or the equivalent.

Upon loading the catalyst in zone A and transporting the resulting catalytic reaction mass into the higher temperature range of zone B, melamine is formed together with decomposition products including ammonia and carbon dioxide. Said products are stripped from the catalyst by the upward moving gas admitted by line 13 and removed by line 17 to product separator 18 for separation and purification. The stripped catalyst particles are continuously thereafter collected in standpipe to form a column in said standpipe of a density greater than the fluidized bed in zone B. By suitable control of valve 16 said mixture containing stripped and lesser amounts of loaded catalyst is recycled to zone A for reloading.

Thus, as described hereinabove, continuous movement of catalyst is effected from zone A to zone B with resulting efficient conversion of urea to melamine. It should be understood that the principles of the present invention as explained with reference to the drawings are equally applicable to substantially any size of converter having zones A and B as a single unit or as separate units and therefore the invention is not to be limited by the drawings. As further illustration but not by way of limitation the following examples are given in which, unless otherwise stated, all parts and percentages are by weight.

*Example 1*

A 5 liter round bottom, three-neck Morton type glass flask was equipped with a sintered glass stirrer adjusted to rotate about ¼ to ½ inch from the bottom of the flask. An ammonia inlet and thermocouple well were positioned in the second neck. The third neck was fitted with a liquid urea feeder designed to feed discrete urea droplets or crystals to the catalyst. The catalyst was calcined silica gel of 0.39 g./cc. apparent bulk density, 0.19% $Na_2O$ content, 1.08 cc./g. pore volume, and 706 m.$^2$/g. surface area. The calcined silica gel had been pretreated with urea at 160° to 350° C. for 2 to 16 hours to eliminate any moisture. To the reaction vessel was added 907 grams catalyst and the temperature was maintained between 170° C. and 225° C. while ammonia was admitted at 0.1 g./min.

Over 1.5 hours 870 grams molten urea was loaded onto the catalyst.

To a 2″ by 24″ heated stripping unit was charged 700 grams of the loaded catalyst. When the reactor temperature reached 375° C., ammonia was flowed through the unit at 15 moles/hr. to fluidize and to strip the loaded catalyst. In 23 hours, 152 grams of crude product containing 147 grams of melamine were collected for a yield of 89.6% based on urea fed.

*Example 2*

To a reaction vessel substantially identical to that of Example 1, maintained at 210–225° C., was added 1000 grams of the pretreated, calcined silica gel. Ammonia gas was passed through the vessel at 0.5 g./min. In 1.0 hour, 486 grams molten urea (at 140–150° C.) was added dropwise and 1055 grams of loaded catalyst product was recovered. Of this product, 683 grams were charged to a stripping unit maintained at 375° C., with an ammonia flow of 4.3 g./min., and reacted for 23 hours. In this time, 47 grams of melamine were collected for a yield of 43% based on urea fed.

Of 594 grams of recovered stripped catalyst, 588 grams were returned to the first reaction flask and reloaded with 440 grams molten urea (at 140–145° C.) which was added dropwise in 1.0 hour under an ammonia flow of 0.1 g./min. 784 grams of loaded catalyst product were obtained, of which 720 grams were charged to the stripping unit maintained at 346° C. with an ammonia flow of 4.3 g./min. After 24 hours, 122 grams melamine (for a yield of 87% based on urea fed) and 484 grams stripped catalyst was collected.

Of the stripped material, 480 grams together with 98 grams similar material from another experiment were charged to the first reaction vessel and reacted as before with 516 grams molten urea. Of the 797 grams loaded product, 700 grams were stripped at 375° C. as before to obtain after 24 hours 138 grams of melamine (for a yield of 87% based on urea fed) and 486 grams stripped catalyst.

*Example 3*

A reactor column was prepared consisting of a 42 inch high Pyrex glass tube, 1¾ inch internal diameter, with a Pyrex glass sintered frit at the bottom to support added material and to pass gases. The tube was wrapped with 0.345Ω/ft. Nichrome ribbon, spaced about 2½ turns per inch, to within 6 inches of the top. The tube was insulated with suitable covering and a thermocouple was centered within the tube for temperature measurement.

To the tube was added 465 grams calcined silica gel catalyst and 345 grams dried crystalline urea. The mixture was fluidized with dry nitrogen gas flowing at 2.5 g./min., heated, and sampled as shown in Table I with the indicated results.

TABLE I

| Temp., °C. | | Time, hrs. | Net rate of energy input to mixture | Net energy input to mixture | Net energy input to SiO$_2$ alone | Net energy towards conversion of urea |
|---|---|---|---|---|---|---|
| From— | To— | | | | | |
| 50 | 150 | .20 | .44 KW | .090 KWH | .034 KWH | .056 KWH = 8 kcal./mole urea. |
| 150 | 250 | .41 | .40 KW | .165 KWH | .046 KWH | .119 KWH = 17.6 kcal./mole urea. |
| 250 | 325 | .16 | .31 KW | .051 KWH | .038 KWH | .012 KWH = 1.8 kcal./mole urea. |
| 325 | 375 | .15 | .23 KW | .034 KWH | .030 KWH | .004 KWH = 0.6 kcal./mole urea. |

KW is kilowatts and KWH is kilowatt hours.

This differential thermal analysis shows that 90% of the heat of reaction, representing substantially all of the heat of reaction, is absorbed before the temperature reaches about 200° C.

By similar differential thermal analyses the loading and stripping reaction steps of Examples 1 and 2 are found to be endothermic, the first step requiring in the order of 16 to 20 kcal./mole urea and the second requiring in the order of 1 to 5 kcal./mole urea. Thus, substantially all of the endotherm, e.g., 90%, required for the conversion of urea to melamine occurs in the loading step and in most instances before the temperature reaches 200° C. Moreover, the net energy input to the reaction, per incremental mole of urea added, decreases as the "load" on the catalyst increases. These examples therefore demonstrate the low heat requirements of the instant process, particularly in the first, loading, step. Although prior art processes require about the same overall heat input, such processes require on the order of twice the heat input in the first step since this step in the prior art is substantially gasification of urea to isocyanic acid rather than decomposition to melem, melam, amelide and the like with loading onto the surface of the catalyst. The latter is a surface phenomenon requiring much less energy. Hence, the present process promotes more uniform contact of melamine intermediate with catalyst and, consequently, more efficient formation of melamine.

We claim:
1. A process for the production of melamine which comprises (1) reactively contacting urea in a first zone at substantially atmospheric pressure and temperature of 130 to 275° C. with a catalyst effective for decomposition of urea to melamine and melamine intermediates, and (2) transporting the resulting catalytic reaction mass to a second zone and reacting therein at a temperature effective for formation of melamine.

2. A continuous process for the production of melamine which comprises (1) reactively contacting urea in a first zone at substantially atmospheric pressure and temperature of 130 to 275° C. with a catalyst effective for decomposition of urea to melamine and melamine intermediates, (2) transporting the resulting catalytic reaction mass to a second zone and reacting therein at a temperature effective for formation of melamine, (3) stripping melamine from said catalytic reaction mass, and (4) recycling the stripped catalytic reaction mass to said first zone.

3. A process as in claim 1 wherein said catalyst is silica gel.

4. A process as in claim 2 wherein said catalyst is silica gel.

5. A process as in claim 1 wherein said zones are fluidized with ammonia gas.

6. A process as in claim 2 wherein said zones are fluidized, and said catalytic reaction mass is stripped, with ammonia gas.

References Cited

UNITED STATES PATENTS 3,300,483  1/1967  Hamprecht et al. ___ 260—249.7

OTHER REFERENCES

German Auslegeschrift 1,209,570, January 1966 (Hamprecht et al.), 3 pp. spec.

WALTER A. MODANCE, *Primary Examiner.*

JOHN M. FORD, *Assistant Examiner.*